United States Patent
Munoz Sanchez et al.

(10) Patent No.: US 10,310,962 B2
(45) Date of Patent: Jun. 4, 2019

(54) INFRASTRUCTURE RULE GENERATION

(71) Applicant: ENTIT SOFTWARE LLC, Sanford, NC (US)

(72) Inventors: Alvaro Munoz Sanchez, Las Rozas (ES); Yekaterina Tsipenyuk O'Neil, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 115 days.

(21) Appl. No.: 15/500,522

(22) PCT Filed: Sep. 24, 2014

(86) PCT No.: PCT/US2014/057142
§ 371 (c)(1),
(2) Date: Jan. 30, 2017

(87) PCT Pub. No.: WO2016/048294
PCT Pub. Date: Mar. 31, 2016

(65) Prior Publication Data
US 2017/0220449 A1 Aug. 3, 2017

(51) Int. Cl.
*G06F 9/44* (2018.01)
*G06F 11/36* (2006.01)
*G06F 11/30* (2006.01)

(52) U.S. Cl.
CPC .......... *G06F 11/3636* (2013.01); *G06F 11/30* (2013.01); *G06F 11/3612* (2013.01)

(58) Field of Classification Search
CPC ............ G06F 11/3636; G06F 11/3644; G06F 11/3612; G06F 9/44521; G06F 11/30
See application file for complete search history.

(56) References Cited

U.S. PATENT DOCUMENTS

| | | | |
|---|---|---|---|
| 6,260,187 B1 * | 7/2001 | Cirne | G06F 9/44521 717/110 |
| 7,739,689 B1 | 6/2010 | Spertus et al. | |
| 8,141,158 B2 | 3/2012 | Calendino et al. | |
| 2003/0088854 A1 * | 5/2003 | Wygodny | G06F 11/3636 717/130 |
| 2004/0078691 A1 * | 4/2004 | Cirne | G06F 11/3624 714/38.13 |

(Continued)

FOREIGN PATENT DOCUMENTS

WO WO-2014041561 A2 3/2014

OTHER PUBLICATIONS

"Architecture and Components," (Web Page), Dec. 9, 2010, available at http://systemscenter.ru/avicodeenterprisedotnetmp2007manual.en/sharepointmp_architecturecomponents.htm (2 pages).

(Continued)

*Primary Examiner* — Tuan A Vu

(57) ABSTRACT

In one implementation, a system can comprise a probe monitor engine to monitor a probe passed to a function of a set of instructions, a propagation engine to identify an infrastructure connection based on an attribute of the probe during a runtime session, and a rule engine to generate an infrastructure rule based on the infrastructure connection and the attribute of the probe.

16 Claims, 4 Drawing Sheets

(56) References Cited

U.S. PATENT DOCUMENTS

| | | | |
|---|---|---|---|
| 2007/0180439 A1* | 8/2007 | Sundararajan | G06F 11/3644 717/158 |
| 2011/0283264 A1* | 11/2011 | Gagliardi | G06F 11/3612 717/130 |
| 2012/0089966 A1 | 4/2012 | Martin et al. | |
| 2012/0260344 A1 | 10/2012 | Maor et al. | |
| 2012/0272322 A1 | 10/2012 | Pistoia et al. | |
| 2012/0311711 A1 | 12/2012 | Amit et al. | |
| 2013/0086676 A1 | 4/2013 | Chess et al. | |
| 2013/0231151 A1 | 9/2013 | Kneckt et al. | |
| 2013/0263209 A1 | 10/2013 | Panuganty | |

OTHER PUBLICATIONS

Apple, Inc., "Source Editor Help: Performing Static Code Analysis," Updated Sep. 18, 2013, available at https://developer.apple.com/library/ios/recipes/xcode_help-source_editor/Analyze/Analyze.html (2 pages).

Korean Intellectual Property Office, International Search Report and Written Opinion for PCT/US2014/057142 dated May 27, 2015 (12 pages).

Leonard, G., "Securing Web Applications Made Simple and Scalable," (Technical Specifications), A SANS Analyst Program Review, SANS Institute InfoSec Reading Room, Sep. 2013, available at http://www.sans.org/reading-room/whitepapers/analyst/securing-web-applications-simple-scalable-34970 (26 pages).

Papagiannis, I.D., "Practical and Efficient Runtime Taint Tracking," (Research Paper), Imperial College London, 2013, available at http://yia.nnis.gr/publications/thesis2013.pdf (197 pages).

Sudeikat, J. et al., "On the Validation of Belief-Desire-Intention Agents," (Research Paper), University of Hamburg, Hamburg University of Applied Sciences available at https://vsis-www.informatik.uni-hamburg.de/getDoc.php/publications/265/promas06_sudeikatetal.pdf, 2006 (16 pages).

Tomb, A., et al. "Variably Interprocedural Program Analysis for Runtime Error Detection," Copyright 2006, Association for Computing Machinery, ISSTA'07, Jul. 9-12, 2007, 11 pages.

* cited by examiner

INFRASTRUCTURE RULE GENERATION

BACKGROUND

Static analysis is a technique to study a program by analyzing program code (e.g., source code and/or object code) without executing the program. Static analysis is commonly performed by an automated static analysis tool to analyze the program code using a mathematical technique and/or program simulation technique. For example, a static analysis tool can simulate code execution paths based on program simulations and/or mathematical functions. A static analysis tool can commonly perform functions to identify coding errors and/or mathematically prove properties about the program code. For example, static analysis can be used to verify properties of a program and locate a potential vulnerability to a malicious attack.

DETAILED DESCRIPTION

Figure 1:
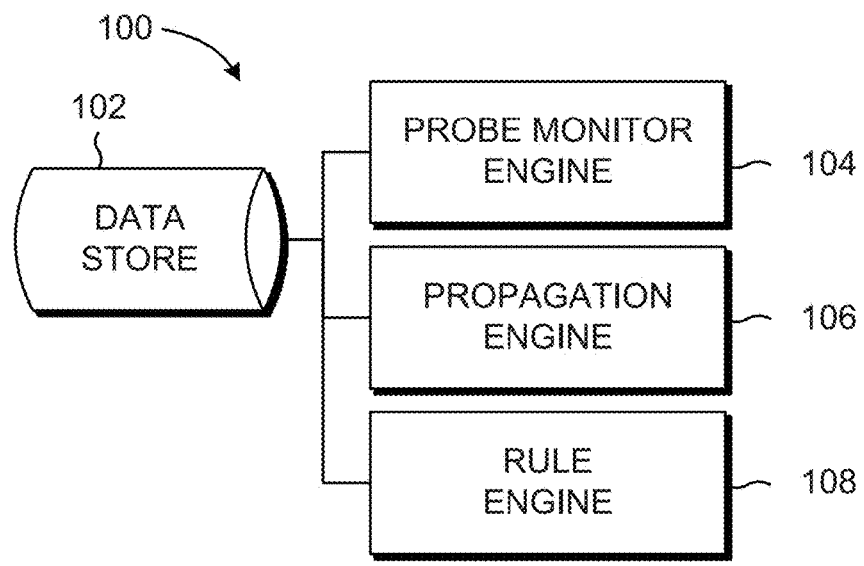
FIGS. 1 and 2 are block diagrams depicting example systems for generating an infrastructure rule.

In the following description and figures, some example implementations of systems for generating an infrastructure rule and/or methods of analyzing code are described. A benefit of static analysis is being able to find vulnerabilities in program code (i.e., set of executable instructions) without executing the program code. However, because code execution paths are simulated, real execution paths may differ from the simulated paths. This can lead to results of the static analysis tool to include false positives or false negatives. For example, two points in the simulated execution path may be statically connected by the static analysis tool when the points are not connected during program execution or the analysis tool may consider the path as not possible when the path is indeed possible during actual program execution. Libraries and frameworks of third parties may need to be modeled manually when the program code is not available. The static analysis tool is to be informed of what function calls introduce user-controlled data into the program and which ones act as a pass-through. Such manual analysis can take extensive effort and may include errors, especially if a library is not popular or otherwise reviewed by static analysis experts. Based on manual analysis, security-related rules and infrastructure rules can be provided to the static analysis tool.

Other forms of code analysis include dynamic analysis and runtime analysis. Dynamic analysis is analysis of a set of instructions performed by executing the set of instructions and responses are monitored. Dynamic analysis is sometimes referred to as black box testing. Runtime analysis can be referred to as grey box testing because the scanner is allowed to see what is happening inside the black box by monitoring the running application such as by using an agent. In dynamic analysis, test inputs are provided via a scanner to act as an attacker. For example, the set of instructions can be a web application and hypertext transfer protocol ("HTTP") requests can be sent to the web application to discover where the application under test ("AUT") accepts input. The dynamic scanner of dynamic analysis (and/or the runtime analyzer of runtime analysis) can utilize a crawler to crawl the application for input slots and utilize a knowledge base to provide attack payloads to the identified areas. The responses of the application to the attack payloads can be analyzed for security vulnerabilities. In the previous example, the scanner applies attacks to diagnose the presence or absence of vulnerabilities by evaluating the web application's HTTP responses to attack payload inputs. As used herein, the term "scanner" can refer to a dynamic scanner, a runtime analyzer, or a combination thereof.

Functionality of a scanner can be utilized to improve static analysis and reduce false results. For example, the crawler of the scanner can be utilized with particular probes (e.g., inputs with cyclic patterns rather than attack payloads) to identify infrastructure (e.g., how the program is engineered and interacts with other programs) and the infrastructure identified using some test executions of the probes can be used during static analysis which does not execute the program.

Various examples described below relate to generating infrastructure rules based on runtime analyzer to monitor how a function behaves. The scanner can identify a connection and/or behavior based on how data is reflected when an argument is passed to a function and returns from that function. By monitoring the data being passed to function, an infrastructure rule regarding that function can be created for static analysis purposes without having the program code available for that function. False results can be minimized by identifying the connections between functions of program codes and supplying an appropriate rule. This can allow the static analyzer to perform taint analysis (i.e., analysis as to whether the program can be tainted with untrusted data) on a program for which the code may not be available.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, and/or modify."

Figure 2:
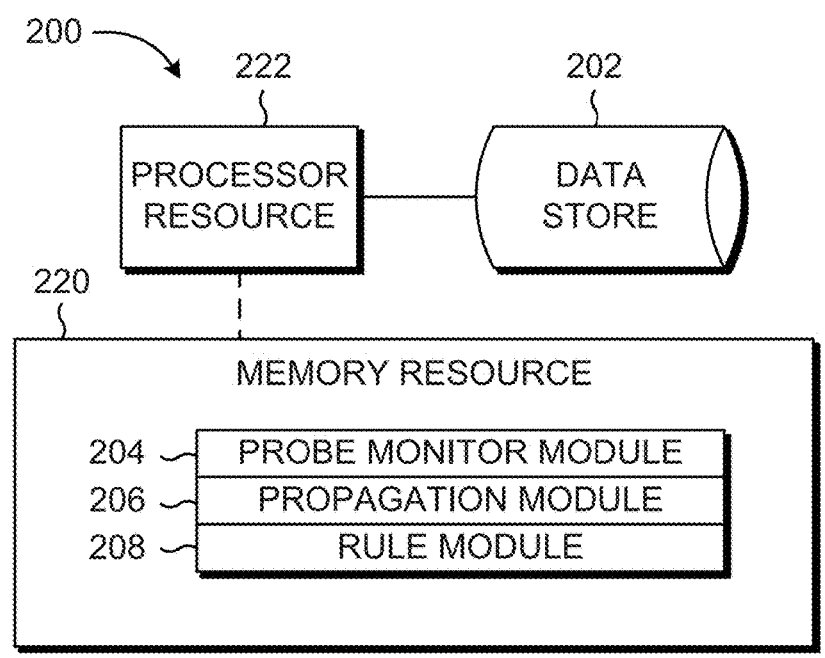

FIGS. 1 and 2 are block diagrams depicting example systems 100 and 200 for generating an infrastructure rule. Referring to FIG. 1, the example system 100 of FIG. 1 generally includes a data store 102, a probe monitor engine 104, a propagation engine 106, and a rule engine 108. In general, the rule engine 108 can generate an infrastructure rule based on information associated with a probe during runtime provided by the probe monitor engine 104 and the propagation engine 106. The probe can be a test argument (e.g., probe argument) that is prepared for purposes of identification during runtime. For example, function inputs and outputs can be monitored in order to automatically generate pass-through rules for a static analysis tool.

The probe monitor engine 104 represents any circuitry or combination of circuitry and executable instructions to receive information of an argument passed to a function of a set of instructions. The probe monitor engine 104 can also represent any circuitry or combination of circuitry and executable instructions to cause a function to be executed by a runtime analyzer and cause the function and/or function arguments to be monitored as the function performs operations using the argument (e.g., as the arguments enter and exit the function). For example, the probe monitor engine 104 can cause an application to execute and perform a particular function based on a predetermined argument as input to the parameter. For another example, the probe monitor engine 104 can cause a first program code to execute with an argument as input and monitor the argument during a runtime session of the first program code as the first program code causes calls to a second program code (i.e., a second set of instructions such as other functions, frameworks, or libraries). For yet another example, a scanner can produce monitor information (i.e., information from monitoring a program during execution) associated with the probe and the monitor information can be sent to and received by the probe monitor engine 104.

The argument to the first set of instructions can include a probe having a predetermined value. For example, the probe monitor engine 104 can maintain the probe as a recognizable value, send the probe to a scanner, and cause the runtime platform to monitor the value of the probe as the function executes. The value of the probe can be a number, a character, a string, or other data structure acceptable by the function of the set of instructions to be tested and/or analyzed. The probe should be a unique value to allow the argument to be tracked as the set of instructions execute. For example, the application can pass the probe to a third party library linked to by the application during runtime. In this manner, the runtime session can include execution of multiple sets of instructions to perform the functionality during a runtime session. The probe can have a cyclic pattern to assist identification of where the probe is modified and how the probe is modified. For example, if the third set of a repeating pattern is modified, the propagation engine 106 can identify how a value is modified (e.g., modifies the arguments at the location of a third set of a repeating pattern) at a connection point. The probe can cause a communication with a scanner and a runtime platform to indicate the location of the probe and the current state of the probe. For example, the probe can be sent to a scanner via the probe monitor engine and monitored by a runtime platform while a program executes on the probe. For another example, the probe monitor engine 104 can cause an agent to monitor a stack memory resource, such as a call stack, during the runtime session by tracing the stack based on the probe and identify a location in the set of instructions where the probe appears during execution of the set of instructions based on the organization of the stack.

The probe monitor engine 104 can cause information related to the probe to be tracked and stored as the set of instructions executes. That information can be provided to the propagation engine 106 to identify how the probe propagates during the runtime session. For example, the probe monitor engine 104 can cause a call stack trace associated with the runtime session and the propagation engine 106 can identify a location in the set of instructions where the probe appears during execution of the set of instructions. The propagation engine 106 represents any circuitry or combination of circuitry and executable instructions to identify an infrastructure connection based on an attribute of the probe during a runtime session. An infrastructure connection represents a connection between executions of set of instructions, such as call from a first function to a second function. For example, the propagation engine 106 can identify an infrastructure connection between the first program code and the second program code based on the monitored information from the probe. This can include program structure points, such as an entry point of a set of instructions or where program codes interconnect to pass information, functionality, or otherwise affect execution of the other program code. For example, a probe can be monitored to find out if the probe is inserted in a database table and if so, when does the probe appear back in the program code in order to connect database operations (e.g., read operations and write operations).

The propagation engine 106 can identify the infrastructure of the program code (e.g., the entry point and propagation flow of the program code) based on the state of the probe (e.g., the status and/or characteristics, such as modifications to the probe). The propagation engine 106 can identify a location in the set of instructions where the probe appears during execution of the set of instructions and/or where the probe exits For example, the propagation engine 106 can identify an entry point and a propagation flow based on a location of the probe and a modification of the probe during a runtime session.

As discussed above, the probe can include a cyclic pattern. The propagation engine 106 can identify a connection of the program code and/or a reflection of the probe based on a difference between the first state of the probe and the second state of the probe. For example, an agent program can record the state of the probe at a first time during runtime and a second time during runtime and compare the differences between the state of the probe at the first time and the state of the probe at the second time to identify a change in the state, such as a modification of the string and at the character of the string where the modification begins. As used herein, a program referred to herein as an agent is used to watch the internal operations performed by the application when under test. For example, a runtime agent can be installed on an application server to assist with identifying the function slots and communications with third party programs (i.e., libraries and frameworks).

The rule engine 108 represents any circuitry or combination of circuitry and executable instructions to generate an infrastructure rule based on the infrastructure connection and the attribute of the probe. For example, the rule engine 108 can be a combination of circuitry and executable instructions to generate an infrastructure rule associated with a program code based on the identified infrastructure connection (e.g., via the propagation engine 106) and the monitored information from the probe. A static analysis rule is a data structure that describes a condition and a result based on the condition to produce a model of the dataflow (e.g., propagation flow of data) through program code. For example, a static analysis rule can cause a static analysis tool to parse a line of code, identify fields and structure of the line of code, and perform a function (such as add a taint flag) based on structure and/or entries of the fields parsed from the line of code. Static analysis rules can be organized into security rules and infrastructure rules. Security rules are static analysis rules related to security based on operation of the program code and known vulnerabilities. An infrastructure rule is a static analysis rule associated with how the program code interacts with other program code, such as frameworks and linked libraries. Example infrastructure rules include source rules and pass-through rules. Source rules are used when a function produces tainted data, such as when tainted data is returned by a function or includes tainted input arguments. Pass-through rules are used when tainted data is transferred, such as when an input function slot is reflected in an output function slot. For example, a pass-through rule can identify a function and describe the function to the static analyzer on how the data of an instance object is passed to a return slot of the function. For another example, the infrastructure rule can be a pass-through rule where tainted data is maintained through a dictionary or map (e.g. tainted data is associated with a map key and the part of map with the tainted data is annotated for when the tainted data is later retrieved). An example data structure of a pass-through rule that could be generated at runtime could include a rule identification value; a function identifier having a namespace, a class name, a function name, and the like; an input argument, and an output argument. The example rule above can identify that the code line example of "String a=text.getData( )" describes that if "text" is tainted, then "a" will also be tainted. The infrastructure rule can be associated with the connection category (e.g., type of connection). For example, an entry point can be associated with a source rule and a program interconnection can be associated with a pass-through rule. A program interconnection can be recognized when a probe exits at a function slot and a reflection of the probe is located at a second function slot, such as the probe entering as an argument to a function and exiting as a result that is a superset of the probe. Infrastructure rules are used to assist a static analyzer tool to connect parts of program code and describe behavior. For example, the infrastructure rule can be generated as part of a file used as input by a static analyzer tool. The infrastructure rule can be provided to a static analysis tool with other information, such as a full analysis of an evidence trace from the scanner.

The rule engine 108 can determine the infrastructure rule based on a first reflection of the probe at a function slot and the probe can include a predetermined string. The reflection can represent a difference between a first probe state and a second probe state. For example, the reflection can be a total reflection when there is no difference in the predetermined value (e.g., string) of the probe between states, a subset of the probe argument (e.g., a set of data that includes a portion of the probe) when the predetermined value is partially reflected, and a superset of the probe argument (e.g., a set of data that includes the entire probe as well as other data) when the predetermined value is reflected with other data. The probe can be scrambled or otherwise modified data as part of the value based on operations of the functions executed during a runtime session.

The rule engine 108 can generate an infrastructure rule where the infrastructure rule is one of a source rule and a pass-through rule. For example, the infrastructure rule can be a pass-through rule to describe an interconnection between a first program code and a second program code. The rule engine 108 can generate a source rule associated with the entry point and a pass-through rule associated with the propagation flow based on how the probe is reflected in a function slot. A function slot is an interceptable point of the function (i.e., executable set of instructions to accomplish a functionality) to provide the value of the probe. Example function slots include an instance object, an input argument, and a return value (i.e., output argument).

The rule engine 108 can compare the identified infrastructure connection to a mapping of a plurality of probe reflections to a plurality of static analysis rules. For example, a reflection of a probe can be identified in a list of a plurality of probe reflections where each member of the list is a data structure having a reference to a static analysis rule. For example, based on the comparison of the probe reflection to the list, a first static analysis rule can be selected from a plurality of static analysis rules based on the reflection. The rule engine 108 can select a template rule and modify the rule based on the state of the probe and/or infrastructure connection. For example, the identified connection can be mapped to a template pass-through rule and the template pass-through rule can be customized based on the reflection and/or state of the probe.

The data store 102 can contain information utilized by the engines 104, 106, and 108. For example, the data store 102 can store a probe, a reflection, an infrastructure rule, a mapping, a location of the static analysis tool, an application programming interface ("API") of a scanner, a rule template, and the like.

FIG. 2 depicts the example system 200 can comprise a memory resource 220 operatively coupled to a processor resource 222. The processor resource 222 can be operatively coupled to a data store 202. The data store 202 can be the same as the data store 102 of FIG. 1.

Referring to FIG. 2, the memory resource 220 can contain a set of instructions that are executable by the processor resource 222. The set of instructions are operable to cause the processor resource 222 to perform operations of the system 200 when the set of instructions are executed by the processor resource 222. The set of instructions stored on the memory resource 220 can be represented as a probe monitor module 204, a propagation module 206, and a rule module 208. The probe monitor module 204, the propagation module 206, and the rule module 208 represent program instructions that when executed function as the probe monitor engine 104, the propagation engine 106, and the rule engine 108 of FIG. 1, respectively. The processor resource 222 can carry out a set of instructions to execute the modules 204, 206, 208, and/or any other appropriate operations among and/or associated with the modules of the system 200. For example, the processor resource 222 can carry out a set of instructions to cause a first program code to execute with a probe as input, receive monitor information of the probe during a runtime session of the first program code, identify an infrastructure connection between the first program code and a second program code based on the monitored information from the probe, and generate an infrastructure rule associated with the second program code based on the identified infrastructure connection and the monitored information from the probe. For another example, the processor resource 222 can carry out a set of instructions to determine an infrastructure rule based on a reflection of a probe at a function slot, compare an infrastructure connection to a mapping of a plurality of probe reflections to a plurality of static analysis rules, select a first static analysis rule of the plurality of static analysis rules based on the reflection, and modify the first static analysis rule based on the identified infrastructure connection.

Figure 4:
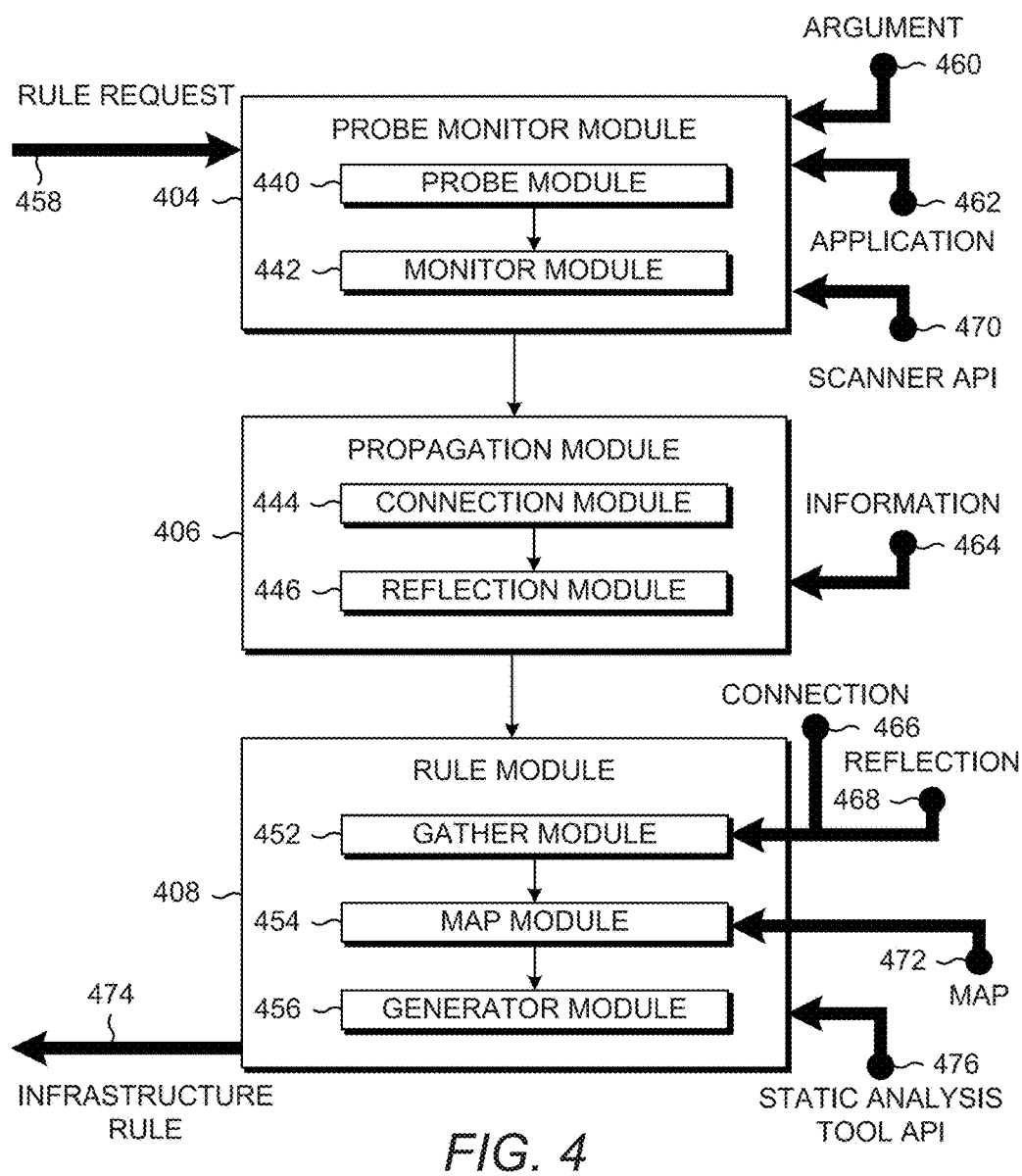
FIG. 4 depicts example modules consistent with example systems for generating an infrastructure rule.

Although these particular modules and various other modules are illustrated and discussed in relation to FIG. 2 and other example implementations, other combinations or sub-combinations of modules can be included within other implementations. Said differently, although the modules illustrated in FIG. 2 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. FIG. 4 depicts yet another example of how functionality can be organized into modules.

The processor resource 222 can be any appropriate circuitry capable of processing (e.g. compute) instructions, such as one or multiple processing elements capable of retrieving instructions from the memory resource 220 and executing those instructions. For example, the processor resource 222 can be a central processing unit ("CPU") that enables generating an infrastructure rule by fetching, decoding, and executing modules 204, 206, and 208. Example processor resources 222 include at least one CPU, a semiconductor-based microprocessor, an application specific integrated circuit ("ASIC"), a field-programmable gate array ("FPGA"), and the like. The processor resource 222 can include multiple processing elements that are integrated in a single device or distributed across devices. The processor resource 222 can process the instructions serially, concurrently, or in partial concurrence.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine-readable, such as computer-readable. The medium can be an electronic, magnetic, optical, or other physical storage device that is capable of containing (i.e., storing) executable instructions. The memory resource 220 can be said to store program instructions that when executed by the processor resource 222 cause the processor resource 222 to implement functionality of the system 200 of FIG. 2. The memory resource 220 can be integrated in the same device as the processor resource 222 or it can be separate but accessible to that device and the processor resource 222. The memory resource 220 can be distributed across devices. The memory resource 220 and the data store 202 can represent the same physical medium or separate physical mediums. The data of the data store 202 can include representations of data and/or information mentioned herein.

In the discussion herein, the engines 104, 106, and 108 of FIG. 1 and the modules 204, 206, and 208 of FIG. 2 have been described as circuitry or a combination of circuitry and executable instructions. Such components can be implemented in a number of fashions. Looking at FIG. 2, the executable instructions can be processor-executable instructions, such as program instructions, stored on the memory resource 220, which is a tangible, non-transitory computer-readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

Figure 5:
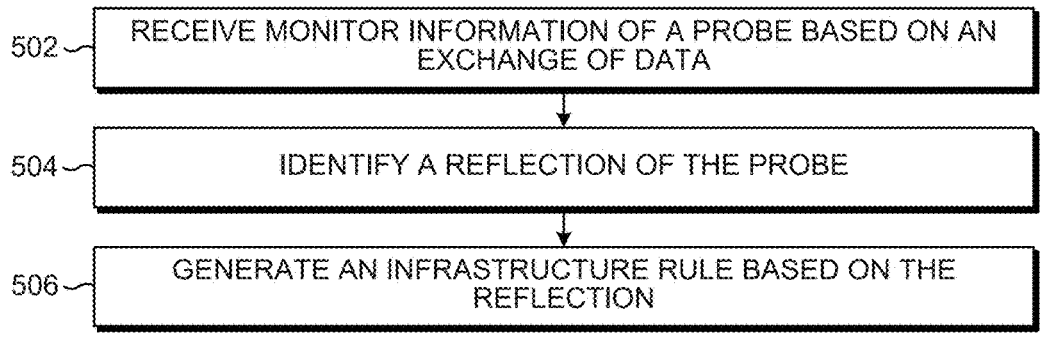
FIGS. 5 and 6 are flow diagrams depicting example methods of analyzing code.
Figure 6:
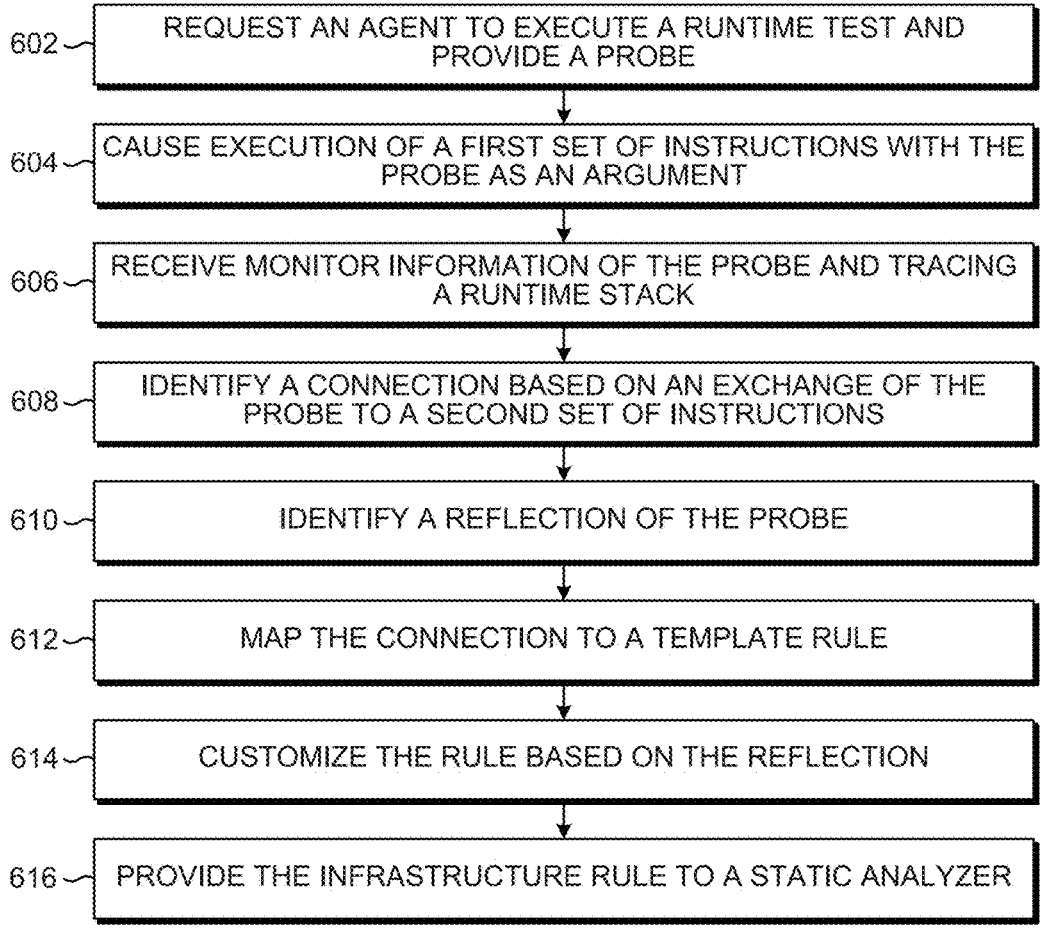

In some examples, the system 200 can include the executable instructions can be part of an installation package that when installed can be executed by the processor resource 222 to perform operations of the system 200, such as methods described with regards to FIGS. 4-6. In that example, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

Figure 3:
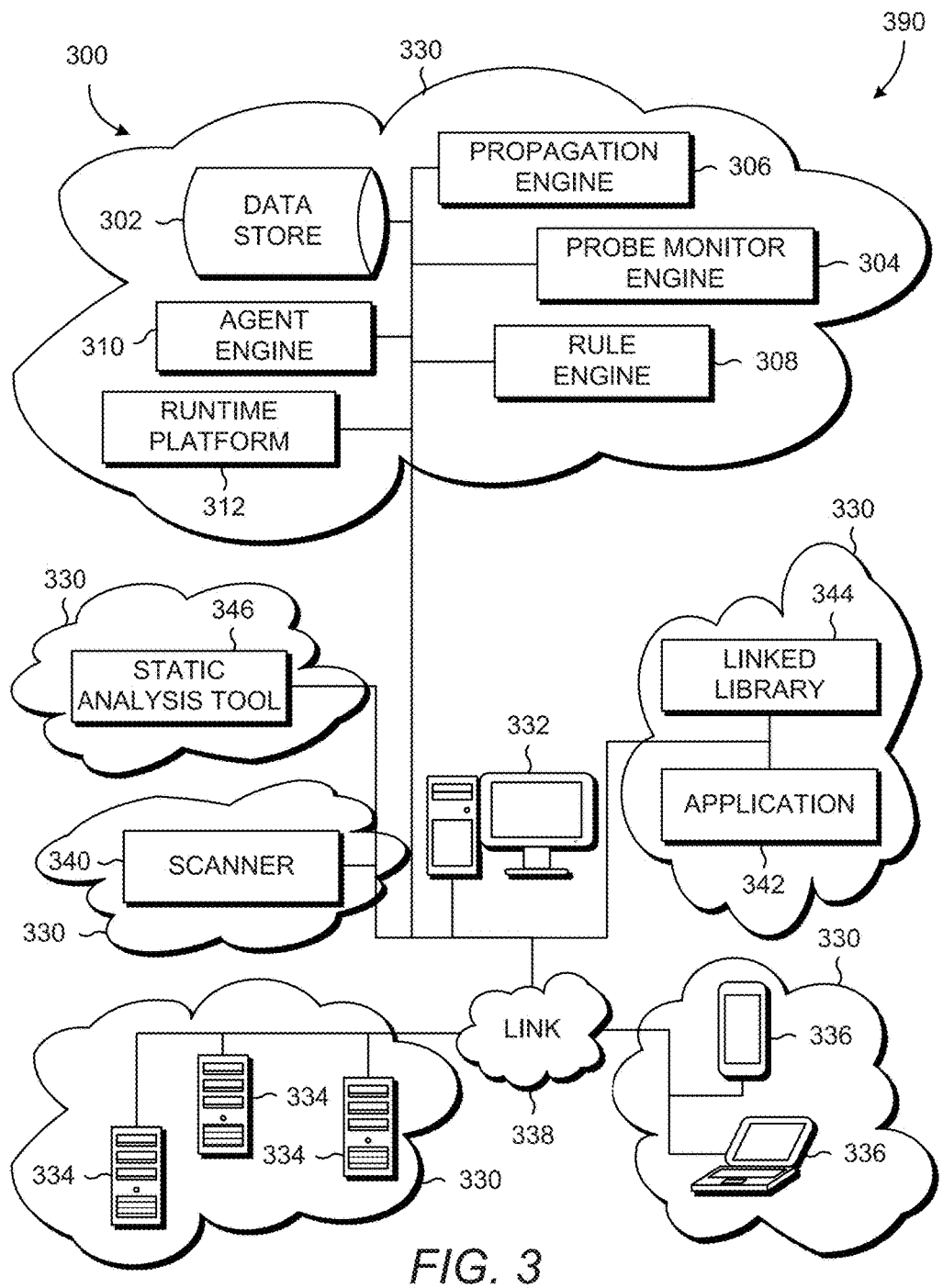
FIG. 3 depicts an example environment in which various systems for generating an infrastructure rule can be implemented.

FIG. 3 depicts example environments in which various example systems 300 can be implemented. The example environment 390 is shown to include an example system 300 for generating an infrastructure rule. The system 300 (described herein with respect to FIGS. 1 and 2) can represent generally any circuitry or combination of circuitry and executable instructions to generate an infrastructure rule based on a probe state. The system 300 can include a probe monitor engine 304, a propagation engine 306, and a rule engine 308 that can be the same as the probe monitor engine 104, the propagation engine 106, and the rule engine 108 of FIG. 1, respectively, and the associated descriptions are not repeated for brevity. The system 300 can also include an agent engine 310 and a runtime platform 312. The agent engine 310 represents circuitry or a combination of circuitry and executable instructions to cause an agent to execute an application 342 during a runtime session to be monitored via a scanner 340 to test a set of instructions, such as the linked library 344 and/or the application 342. The runtime platform 312 represents a circuitry or a combination of circuitry and executable instructions to provide an interface, such as an API, for the scanner 340 and the static analysis tool 346. As shown in FIG. 3, the engines 304, 306, 308, 310, and 312 can be integrated into a compute device, such as a service device 334. The engines 304, 306, 308, 310, and 312 can be integrated via circuitry or as installed instructions into a memory resource of the compute device.

The example environment 390 can include compute devices, such as developer devices 332, service devices 334, and user devices 336. A first set of instructions can be developed and/or modified on a developer device 332. For example, an application can be developed and modified on a developer device 332 and stored onto a web server, such as a service device 334. The service devices 334 represent generally any compute devices to respond to a network request received from a user device 336, whether virtual or real. For example, the service device 334 can operate a combination of circuitry and executable instructions to provide a network packet in response to a request for a page or functionality of an application. The user devices 336 represent generally any compute devices to communicate a network request and receive and/or process the corresponding responses. For example, a browser application may be installed on the user device 336 to receive the network packet from the service device 334 and utilize the payload of the packet to display an element of a page via the browser application.

The compute devices can be located on separate networks 330 or part of the same network 330. The example environment 390 can include any appropriate number of networks 330 and any number of the networks 330 can include a cloud compute environment. A cloud compute environment may include a virtual shared pool of compute resources. For example, networks 330 can be distributed networks comprising virtual computing resources. Any appropriate combination of the system 300 and compute devices can be a virtual instance of a resource of a virtual shared pool of resources. The engines and/or modules of the system 300 herein can reside and/or execute "on the cloud" (e.g. reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 104, 106, and 108 of FIG. 1 and/or the modules 204, 206, and 208 of FIG. 2 can be distributed across devices 332, 334, 336, or a combination thereof. The engine and/or modules can complete or assist completion of operations performed in describing another engine and/or module. For example, the probe monitor engine 304 of FIG. 3 can request, complete, or perform the methods or operations described with the probe monitor engine 104 of FIG. 1 as well as the propagation engine 106 and the rule engine 108 of FIG. 1. Thus, although the various engines and modules are shown as separate engines in FIGS. 1-3, in other implementations, the functionality of multiple engines and/or modules may be implemented as a single engine and/or module or divided in a variety of engines and/or modules. In some example, the engines of the system 300 can perform example methods described in connection with FIGS. 4-6.

FIG. 4 depicts modules consistent with example systems for generating an infrastructure rule. Referring to FIG. 4, the example modules of FIG. 4 generally include a probe monitor module 404, a propagation module 406, and a rule module 408. The example modules of FIG. 4 can be implemented on a compute device having a processor resource, such as service device 334 of FIG. 3.

The processor resource can execute a set of instructions to, based on a rule request 458, cause the instructions of the probe monitor module 404 to be retrieved. The probe monitor module 404 can include a set of instructions to cause a processor resource to perform monitoring of a probe during a runtime session of an application 462. The probe monitor module 404 can include program code, such as probe module 440 and monitor module 442. The probe module 440 represents executable instructions that when executed cause the processor resource to provide an argument 460 having a unique value. For example, the probe module 440 can cause a processor resource to generate a probe with a unique value and cyclic pattern and provide the probe as input for execution of an application 462. For another example, the probe value can be received by a scanner as an argument 460 to execute the application 462. The monitor module 442 represents executable instructions that when executed cause the processor resource to receive the monitor information 464. For example, the monitor module 442 can represent executable instructions that when executed cause a scanner to track or otherwise monitor the probe during execution of the application 442 and receive monitor information 464 from the scanner (such as via the scanner API 470) to provide to the propagation module 406. For example, the rule request 458 can cause a processor resource executing the monitor module 440 to received information from tracking the probe during execution of the application 462 and store the state of the probe at identified points of the execution, such as when the application 462 passed the probe to a third party library to complete a function. The processor resource executing the probe monitor module 404 can provide information 464 associated with execution of the application 462 during the runtime session. The information 464 can include data associated with the probe, such as a state of the probe, and/or connection information. The information 464 can be used by a processor resource executing the propagation module 406. The propagation module 406 can include executable instructions, such as a connection module 444 and a reflection module 446. The connection module 444 represents executable instructions that when executed cause the processor resource to identify a connection between a point of the application 462 and a point of a third party program, such as a linked library, based on the information 464 provided from the scanner. For example, the dataflow can be discovered by identifying a plurality of points of an application and a plurality of points of the third party program and identify which of the plurality of points of the applications map to connections with the plurality of points of the third party program. The reflection module 446 represents executable instructions that when executed cause a processor resource to identify a reflection (e.g., a modification) of the probe during the runtime session.

The rule module 408 provides an infrastructure rule to a static analysis tool when executed by a processor resource and include executable instructions (such as a gather module 452, a map module 454 and a generator module 456) to facilitate the operations of the processor resource. For example, the rule module 408 can cause a processor resource to gather information, map that information, and create an infrastructure rule based on the mapping. The gather module 452 represents executable instructions that when executed cause the processor resource to receive the connections and propagation flow based on the monitored probe during the runtime session. For example, a processor resource executing the gather module 452 can receive the connection 466 and the reflection 468 identified by the processor resource when executing the propagation module 406. The map module 454 represents executable instructions that when executed cause the processor resource to identify an association between the connection 466 and/or reflection 468 to an infrastructure rule based on a map 472. The generator module 456 represents executable instructions that when executed cause a processor resource to generate an infrastructure rule based on the map, the connection, and the reflections. The rule module 408 can provide the infrastructure rule 474 to a static analysis tool. For example, the generated rules can be written to a file that is used as input to a static analysis tool or via a static analysis tool API 476 provided and/or known to the rule module 408. Multiple runtime sessions, such as runtime session utilizing other sets of instructions can be used to determine infrastructure of a set of program code. For example, four different applications that use a certain library can each be executed and the resulting information of the probe from all the runtime sessions can be aggregated and analyzed for similarities to identify an infrastructure rule that associates with a combination of a connection and a reflection (or multiple combinations).

FIGS. 5 and 6 are flow diagrams depicting example methods of analyzing code. Referring to FIG. 5, example methods of analyzing code can generally comprise receiving monitor information of the probe based on an exchange of data between a first set of instructions and a second set of instructions, identifying a reflection of the probe, and generating an infrastructure rule based on the connection and the reflection.

At block 502, monitor information of a probe is received based on an exchange of data between a first set of instructions and a second set of instructions. The probe can be provided as input for a function performed by a processor resource when executing the first set of instructions. The probe can comprise a cyclic pattern to assist identification of a change (i.e., a reflection) to the probe. As the probe argument is used and manipulated, the unique value of the probe can be identified at various points in the execution of the set of instructions, such as at function slots. Information about the probe (i.e., probe data) can be gathered at the monitored points, such as a return value, and sent to a rule generator system to produce infrastructure rules for static analysis. For example, a scanner can be caused to gather probe data and a communication from scanner can be analyzed by an agent to produce monitor information (such as probe data based on the exchanged information) that is usable to identify attributes of the probe, such as a change in state of the probe. A reflection of the probe is identified at block 504. The reflection can describe a location of a difference between the first state of the probe and the second state of the probe. For example, the first two sets of a cyclic pattern of a probe value may remain unmodified from the input state of the probe and the output state of the probe. An infrastructure rule is generated at block 506 based on the reflection. For example, a pass-through infrastructure rule can be generated to describe an interconnection between a first program code and a second program code. For another example, an infrastructure rule based on possible tainted data at the beginning of a string can be used when the reflection shows that the first two sets of a cyclic pattern of the probe remain unmodified after being executed by the first set of instructions. The infrastructure rule can be placed in an electronic file compatible with a static analyzer tool for use in reducing false results, such as false negative or false positive indications of vulnerability.

FIG. 6 includes blocks similar to blocks of FIG. 5 and provides additional blocks and details. In particular, FIG. 6 depicts additional blocks and details generally regarding requesting an agent to execute a runtime test, causing execution of a first set of instructions with a probe as an argument, identifying a connection based on an exchange of the probe to the second set of instructions, mapping the connection to a template rule, customizing the template rule based on the reflection, and providing the infrastructure rule to a static analyzer. Blocks 606, 610, and 614 are similar to blocks 502, 504, and 506 of FIG. 5 and, for brevity, their respective descriptions have not been repeated.

At block 602, an agent is requested to execute a runtime test. An agent can be deployed as monitoring program, such as a program to monitor a virtual machine. For example, as an application executes in the virtual machine, the agent can monitor the processes of the virtual machine including arguments and communications being passed between processes. For another example, the agent can monitor a call stack allocated to the runtime session. At block 604, a first set of instructions can be caused to be executed, such as execution in a monitored virtual machine, with a probe as an argument to the first set of instructions. As the first set of instructions execute on a processor resource, the probe can be monitored and the runtime stack (i.e., the call stack allocated to the runtime session in which the first set of instructions is executing) can be traced. For example, the probe can be traced as the unique value is passed to functions and/or as the functions manipulate the probe (as monitored in the call stack). The agent can be caused to analyze a communication from a scanner to produce monitor information based on the exchange of data between sets of instructions, such as between an application and a third party library.

At block 608, a connection is identified based on an exchange of the probe to a second set of instructions. For example, based on the monitored information, an exchange of the probe to a second set of instructions can be identified and that pass of data can be identified as a connection between the first set of instructions and the second set of instructions. For another example, a function slot can be identified based on the stack trace information, such as an object instantiation of a class associated with the probe and/or function to be tested, where the stack is caused to be traced for the runtime session of the application execution. The connection can be identified by modeling the infrastructure of the application. For example, the calls of a function that initiate new processes can be modeled in a tree of function calls based on dependency. At block 610, the reflection of the probe is identified. The reflection of the probe is based on the state of the probe, such as a modification of the probe or adding the probe to a data structure, whether in whole or in part. Identifying a reflection can include modeling a dataflow of a second set of instructions based on the changes or inclusions of the probe in a data set, such as a superset of the probe being made available as a return value.

At block 612, the connection is mapped to a template rule. The connection can be mapped based on the category of connection, such as an exchange with a linked library or the use of a framework. The mapping of the connection to a rule can be based on a known level of false analysis results. For example, the template rule can be a rule that reduces the false positives or false negatives of a vulnerability category based on the false result likelihood of combination of the category of connection and the category of reflection shown by the probe during the runtime session. At block 614, the rule can be customized based on the reflection. The reflection of the probe represents the modifications and/or use of the probe in a set of instructions and the rule can be selected and/or modified based on the category of the reflection (e.g., the type of modification to the probe). A map of known connections (e.g., connection categories) and known reflections (e.g., reflection categories) can be used to identify the template rule and/or the customizations to the rule. After generating the infrastructure rule by selecting a template rule and customizing the template rule, the infrastructure rule can be provided to a static analyzer at block 616. For example, the customized template rule can be sent as an input (or via a static analysis tool API, for example) to a static analysis tool for use in a static analysis of the application source code where the application uses a linked library for which the program code is not available. For another example, a static analysis dataflow can be heuristically identified based on a file including a plurality of rules produced based on a monitored stack trace and a level of false results likelihood.

Although the flow diagrams of FIGS. 4-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims.

What is claimed is:

1. A system comprising:
a processor; and
a non-transitory storage medium storing instructions executable on the processor to:
receive information of a probe passed to a function of a set of instructions, the probe having a predetermined value;
identify an infrastructure connection based on an attribute of the probe during a runtime session, the set of instructions to execute during the runtime session, the infrastructure connection comprising a connection from a first program code of the set of instructions to a second program code based on monitoring information from the probe as the probe propagates during the execution of the set of instructions, the information monitored based on an exchange of data between a first set of instructions and a second set of instructions;
generate an infrastructure rule based on the infrastructure connection and the attribute of the probe; and
provide the infrastructure rule to a static analysis tool for use in a static analysis of the set of instructions by the static analysis tool.

2. The system of claim 1, wherein the instructions are executable on the processor to:
identify an entry point and a propagation flow based on a location and a modification of the probe during the runtime session;
send the probe to a scanner; and
generate a source rule associated with the entry point and a pass-through rule associated with the propagation flow based on how the probe is reflected in a function slot.

3. The system of claim 2, wherein:
the set of instructions is a third party library linked to an application executable during the runtime session;
the infrastructure rule is one of the source rule and the pass-through rule; and
the function slot is one of an instance object, an argument, and a return value.

4. The system of claim 1, wherein the instructions are executable on the processor to:
cause a call stack trace associated with the runtime session; and
identify a location in the set of instructions where the probe appears as the probe propagates during execution of the set of instructions.

5. The system of claim 1, wherein the instructions are executable on the processor to:
cause a stack trace associated with the second program code during the runtime session; and
produce a file comprising a plurality of rules to identify a static analysis dataflow based on a monitored stack trace and a level of false result likelihood, the infrastructure rule comprising a first rule of the plurality of rules and the file compatible with the static analyzer.

6. The system of claim 1, wherein the infrastructure rule comprises a source rule associated with the function producing tainted data, and a pass-through rule associated with transfer of the tainted data.

7. The system of claim 6, wherein the pass-through rule identifies the function and describes how data is passed to a return slot of the function.

8. A non-transitory computer readable storage medium comprising instructions executable by one or more processors to:
cause a first program code to execute with a probe as input, the first program code linked to a second program code and the probe comprising a unique value;
receive monitored information from the probe during a runtime session of the first program code, the monitored information based on an exchange of data between a first set of instructions and a second set of instructions, as the probe propagates during tine execution of the first program code;
identify an infrastructure connection between the first program code and the second program code based on the monitored information from the probe; and
generate an infrastructure rule associated with the second program code based on the infrastructure connection and the monitored information from the probe,
wherein generating the infrastructure rule comprises determining the infrastructure rule based on a first reflection of the probe at a function slot the probe comprising a predetermined string prepared as probe argument.

9. The non-transitory computer readable storage medium of claim 8, wherein:
the first reflection is one of a total reflection of the probe argument, a subset of the probe argument, and a superset comprising the probe argument;
the function slot is an interceptable point of a function to provide the unique value of the probe; and
the infrastructure rule is a pass-through rule to describe the infrastructure interconnection between the first program code and the second program code.

10. The non-transitory computer readable storage medium of claim 8, wherein generating the infrastructure rule comprises:
comparing the infrastructure connection to a mapping of a plurality of probe reflections to a plurality of static analysis rules, the first reflection being one of the plurality of probe reflections;
selecting a first static analysis rule of the plurality of static analysis rules based on the first reflection; and
modifying the first static analysis rule based on the infrastructure connection.

11. A method executed by one or more hardware processors to implement a process of analyzing code, comprising:
receiving monitor information of a probe based on an exchange of data between a first set of instructions and a second set of instructions as the probe propagates during an execution of a program, wherein receiving the monitor information of the probe comprises causing a scanner to gather probe data from the probe at a function slot;
identifying a connection based on the exchange of the data, wherein identifying the connection comprises modeling an infrastructure of the first set of instructions and the second set of instructions;
identifying a reflection of the probe, the reflection comprising a difference between a first state of the probe as an input argument and a second state of the probe as an output argument, wherein the probe data includes the reflection of the probe, and identifying the reflection comprises modeling a dataflow of the second set of instructions;
generating an infrastructure rule based on the connection and the reflection; and providing the infrastructure rule to a static analysis tool for use in a static analysis of the first set of instructions by the static analysis tool.

12. The method of claim 11, comprising:
requesting an agent to execute a runtime test of the second set of instructions;
causing execution of the first set of instructions with the probe as an argument, the probe comprising a unique value;
causing the agent to analyze a communication from a scanner to produce the monitor information based on the exchange of data; and
providing the infrastructure rule to a static analyzer.

13. The method of claim 11, comprising:
causing a stack trace associated with the second set of instructions during a runtime session; and
producing a file comprising a plurality of rules to identify a static analysis dataflow based on a monitored stack trace and a level of false result likelihood, the infrastructure rule comprising a first rule of the plurality of rules and the file compatible with the static analyzer.

14. A method executed by one or more hardware processors to implement a process of analyzing code, comprising:
receiving monitor information of a probe based on an exchange of data between a first set of instructions and a second set of instructions as the probe propagates during an execution of a program;
identifying a connection based on the exchange of the data;
identifying a reflection of the probe, the reflection being a difference between a first state of the probe as an input argument and a second state of the probe as an output argument;
generating an infrastructure rule based on the connection and the reflection;
requesting an agent to execute a runtime test of the second set of instructions;
causing execution of the first set of instructions with the probe as an argument;
causing the agent to analyze a communication from a scanner to produce the monitor information based on the exchange of data; and
providing the infrastructure rule to a static analyzer to perform a static analysis of the first set of instructions, wherein identifying the connection and identifying the reflection of the probe are performed by the agent, the probe comprising a cyclic pattern, and the reflection describing a location of the difference between the first state and the second state.

15. The method of claim 14, wherein:
receiving the monitor information of the probe comprises causing the scanner to gather probe data from the probe at a function slot, the probe data including the reflection of the probe; and
identifying the connection comprises modeling an infrastructure of the first set of instructions and the second set of instructions; and
identifying the reflection comprises modeling a dataflow of the second set of instructions.

16. A non-transitory computer readable storage medium comprising instructions executable by a one or more processors to:
receive monitor information of a probe based on an exchange of data between a first set of instructions and a second set of instructions as the probe propagates during an execution of a program;
identify a connection based on the exchange of the data;
identify a reflection of the probe, the reflection being a difference between a first state of the probe as an input argument and a second state of the probe as an output argument;
generate an infrastructure rule based on the connection and the reflection, wherein generating the infrastructure rule comprises: mapping the connection to a template pass-through rule; and customizing the template pass-through rule based on the reflection; and
provide the infrastructure rule to a static analysis tool for use in a static analysis of the first set of instructions by the static analysis tool.

* * * * *